United States Patent
Whang et al.

(10) Patent No.: US 7,488,517 B2
(45) Date of Patent: Feb. 10, 2009

(54) METHOD OF PRODUCING POROUS NITRILE RUBBER COATED INDOOR ATHLETIC SOCKS

(76) Inventors: Brian Whang, 3118 Highlander Rd., Fullerton, CA (US) 92833; Young Choon Kang, 3118 Highlander Rd., Fullerton, CA (US) 92833

( * ) Notice: Subject to any disclaimer, the term of this patent is extended or adjusted under 35 U.S.C. 154(b) by 0 days.

(21) Appl. No.: 11/724,418

(22) Filed: Mar. 15, 2007

(65) Prior Publication Data
US 2008/0032056 A1    Feb. 7, 2008

Related U.S. Application Data

(63) Continuation-in-part of application No. 11/497,475, filed on Aug. 2, 2006, now abandoned.

(51) Int. Cl.
*B05D 5/00* (2006.01)
*B05D 1/18* (2006.01)

(52) U.S. Cl. .................................... 427/412; 427/430.1

(58) Field of Classification Search ........................ None
See application file for complete search history.

(56) References Cited

U.S. PATENT DOCUMENTS

| | | | |
|---|---|---|---|
| 4,255,949 A | 3/1981 | Torneburg | 66/185 |
| 5,649,326 A | 7/1997 | Richard, Jr. et al. | 2/161.7 |
| 6,139,929 A | 10/2000 | Hayton et al. | 428/35.2 |
| 6,280,673 B1 | 8/2001 | Green et al. | 264/255 |
| 6,391,409 B1 | 5/2002 | Yeh et al. | 428/35.7 |
| 6,618,861 B2 | 9/2003 | Saks et al. | 2/161.7 |
| 6,993,793 B1 | 2/2006 | Li | 2/161.8 |
| 2004/0103467 A1 | 6/2004 | Allan et al. | 2/159 |
| 2005/0120463 A1 | 6/2005 | Cacioppo | 2/239 |
| 2006/0026740 A1 | 2/2006 | Vargas et al. | 2/239 |

*Primary Examiner*—William Phillip Fletcher, III (57) ABSTRACT

A method of producing a porous, rubbery polymer coated sock comprising: 1) preparing a double layered sock; 2) wearing the sock on mold hanging on a continuous line; 3) pretreating the sole portion of the sock a with calcium nitrate solution; 4) preparing a first nitrile rubber solution by stirring a solution comprising foaming agents and acrylo-nitrile butadiene rubber (NBR) at 1,200 r.p.m. for 30 minutes; 5) dipping the sock worn on the mold in a first, deep bath containing the first, foamed nitrile rubber solution; 6) air-drying the solvent in the polymer solution and developing foam in the rubber layer; 7) preparing a second, foamed nitrile rubber solution by stirring a solution comprising foaming agents and nitrile rubber at 1,200 r.p.m. for 30 minutes; 8) dipping sock worn on the mold in a second, shallow bath containing the second, foamed nitrile rubber solution; 9) air-drying the solvent in the second polymer solution and developing foam in the rubber layer; and 10) washing the sock from step 9) in a cleaning solution to eliminate the calcium nitrate and organic solvents and drying the washed sock 110° C. for 40 minutes. The sock thus produced has a bottom face covered with nitrile rubber foams having 0.5 μm voids therein. The portion of the sock from toe to ball is coated with nitrile rubber foam of 1 mm to 3 mm thickness, while the heel portion of the sock is coated with nitrile foam of 0.5 mm thickness. The nitrile rubber foam coating provides a friction surface as well as a cushion for shock absorption.

6 Claims, 7 Drawing Sheets

METHOD OF PRODUCING POROUS NITRILE RUBBER COATED INDOOR ATHLETIC SOCKS

Current application is a continuous in part of U.S. patent application Ser. No. 11/497,475 filed Aug. 2, 2006 which is now abandoned.

FIELD OF THE INVENTION

Current application relates to a method of producing polymer coated socks, especially related to a sock partially coated with a porous, rubbery polymer with different thickness depends on the portion of a sock.

BACKGROUND OF THE INVENTION

More people care about their health than before. The most popular method of keeping health is jogging or exercise in health club. When a user tries an indoor treadmill, he/she has to bring two sets of shoes and socks. One running shoes, one normal shoe and two set of socks. This is because most of people wear socks inside of running shoes even when they use an indoor treadmill. After that, they usually take socks to home for immediate laundry. But they leave the shoes in the locker of the gym or take home. Though they bring the shoes to their house they do not wash the running shoes immediately. That's because it is not easy to wash a shoes. Therefore, they use the same shoes couple of times though it smells bad and they know that it is not good for foot sanitary. Repeated use of same shoes, which is wet by sweat of the wearer, may cause athlete's foot or corn. It is a purpose of the current invention to provide a method of producing footwear that is easy to clean and wear like normal socks and at the same time protects wearer's foot from shock of running. Then, an indoor treadmill user will carry only the footwear of the current invention instead of brings big smelling running shoes.

DESCRIPTION OF THE PRIOR ART

U.S. Patent Application publication 20060026740 to Vargas; Stacey L., et al. illustrates a sock used in pilates including a medial support about an arch portion of the sock, a side support member extending longitudinally along a lateral edge, a metacarpal support member, a reinforcement member extending from a heel portion to the metacarpal support member, and a plurality of raised bumps located on a lower surface to provide tactile response to weight shift and pressure due to posture that can be used to correct or adjust posture during pilates exercises. Method of manufacturing is not disclosed.

U.S. Patent Application publication 20050120463 to Cacioppo, Joseph illustrates a disposable hygienic sock, maintains an upper mesh layer, a lower solid layer, coupled to the upper mesh layer, and a plurality of friction surfaces, disposed on the bottom of the lower layer. The upper mesh layer, allows the free flow of water into and out of the sock and the friction surfaces are configured to prevent a wearer from slipping on slick or wet surfaces. However, this fails to teach how to make it.

U.S. Pat. No. 6,139,929 to Hayton, et al. discloses a composite sock which consists of an inner stretchable fabric envelope, a bag-like barrier component which is liquid water impermeable, and water vapor permeable, and a second or outer stretchable fabric envelope. Making method is extremely sophisticated.

U.S. Pat. No. 4,255,949 to Thorneburg illustrates an athletic socks provided with shock absorber cushion pads in the inner portions of the arch areas and being formed by a sufficiently greater amount of yarn being knit in the inner arch portions than the amount of yarn knit in the outer portions of the arch. The shock absorber cushion pads are formed by terry loops in the inner portions of the arch area.

U.S. Patent Application publication 20040103467 to Schmitt, Allan C., et al. illustrates a glove including a flexible portion designed to fit over a wearer's hand. The flexible portion, such as rubber, having an inner surface adjacent wearer's hand and an outer surface. The flexible portion is impervious to passage of predetermined fluids there through. The glove is made by spraying a plurality of small cotton fibers onto the outer surface of the flexible material of glove, which has been covered with an adhesive.

U.S. Pat. No. 6,993,793 to Li illustrates an industrial glove comprises an inner cotton layer. The net layer is made of cotton material or metal material. The material of the outer rubber layer is selected from one of Nitrile-Butadiene Rubber, Nature Rubber, Polyvinylchloride and Polyurethane. U.S. Pat. No. 6,618,861 to Saks, et al. illustrates a method of multiple dipping to make gloves with a clear wrist portion from rubbers only. U.S. Pat. No. 6,391,409 to Yeh, et al. illustrated a powder-free natural rubber and synthetic elastomer gloves. U.S. Pat. No. 6,280,673 to Green, et al. illustrates a modified elastomeric having a lubricous coating made up of polyvinyl alcohol and a thickening agent. The thickening agent is initially added in order to increase the processability of the polyvinyl alcohol coating in order to prevent runbacks and drips during the manufacturing process. The polyvinyl alcohol coating becomes lubricous when wetted in a water bath and therefore becomes particularly useful in applying a water-activated resin casting material for forming orthopaedic casting bandages. U.S. Pat. No. 5,649,326 to Richard, Jr., et al. illustrates a lubricous glove, which is made of a base material having a coating thereon of a hydrophilic lubricant mixed with a substantial portion of the material of the base material.

None of the prior art illustrates a method of producing a sock that is coated with rubbery polymers with different thickness based on the portion of the sock.

SUMMARY OF THE INVENTION

It is a purpose of the current invention to provide a method of producing a foot wear that is easy to clean and wear like normal socks and at the same time protects wearer's foot from shock of running. Then, amateur indoor athletes, such as treadmill users, need not carry additional big smelling running shoes to gym. Instead, they will carry only 'sock like' footwear of the current invention. A method of producing a porous, rubbery polymer coated sock is provided. The method is comprised of: 1) preparing a double layered sock; 2) wearing the sock on mold hanging on a continuous line; 3) pre-treating the sole portion of the sock a with calcium nitrate solution; 4) preparing a first nitrile rubber solution by stirring a solution comprising foaming agents and acrylo-nitrile butadiene rubber (NBR) at 1,200 r.p.m. for 30 minutes; 5) dipping the sock worn on the mold in a first, deep bath containing the first, foamed nitrile rubber solution; 6) air-drying the solvent in the polymer solution and developing foam in the rubber layer; 7) preparing a second, foamed nitrile rubber solution by stirring a solution comprising foaming agents and nitrile rubber at 1,200 r.p.m. for 30 minutes, 8) dipping sock worn on the mold in a second, shallow bath containing the second, foamed nitrile rubber solution; 9) air-drying the solvent in the second polymer solution and developing foam in the rubber layer; and 10) washing the sock from step 9) in a cleaning solution to eliminate the calcium nitrate and organic, solvents and drying the washed sock 110° C. for 40 minutes. The sock thus produced has a bottom face covered with nitrile rubber foams having 0.5 μm voids therein. The portion of the sock from toe to ball is coated with nitrile rubber foam of 1 mm to 3 mm thickness, while the heel portion of the sock is coated with nitrile foam of 0.5 mm thickness.

BRIEF DESCRIPTION OF THE DRAWINGS

FIG. 2-A is a schematic drawing of crew sock used for manufacturing polymer coated sock according to current invention.

FIG. 2-B is a schematic drawing of ankle sock used for manufacturing polymer coated sock according to current invention.

FIG. 2-C is a schematic drawing of low cut sock used for manufacturing polymer coated sock according to current invention.

Figure 1:
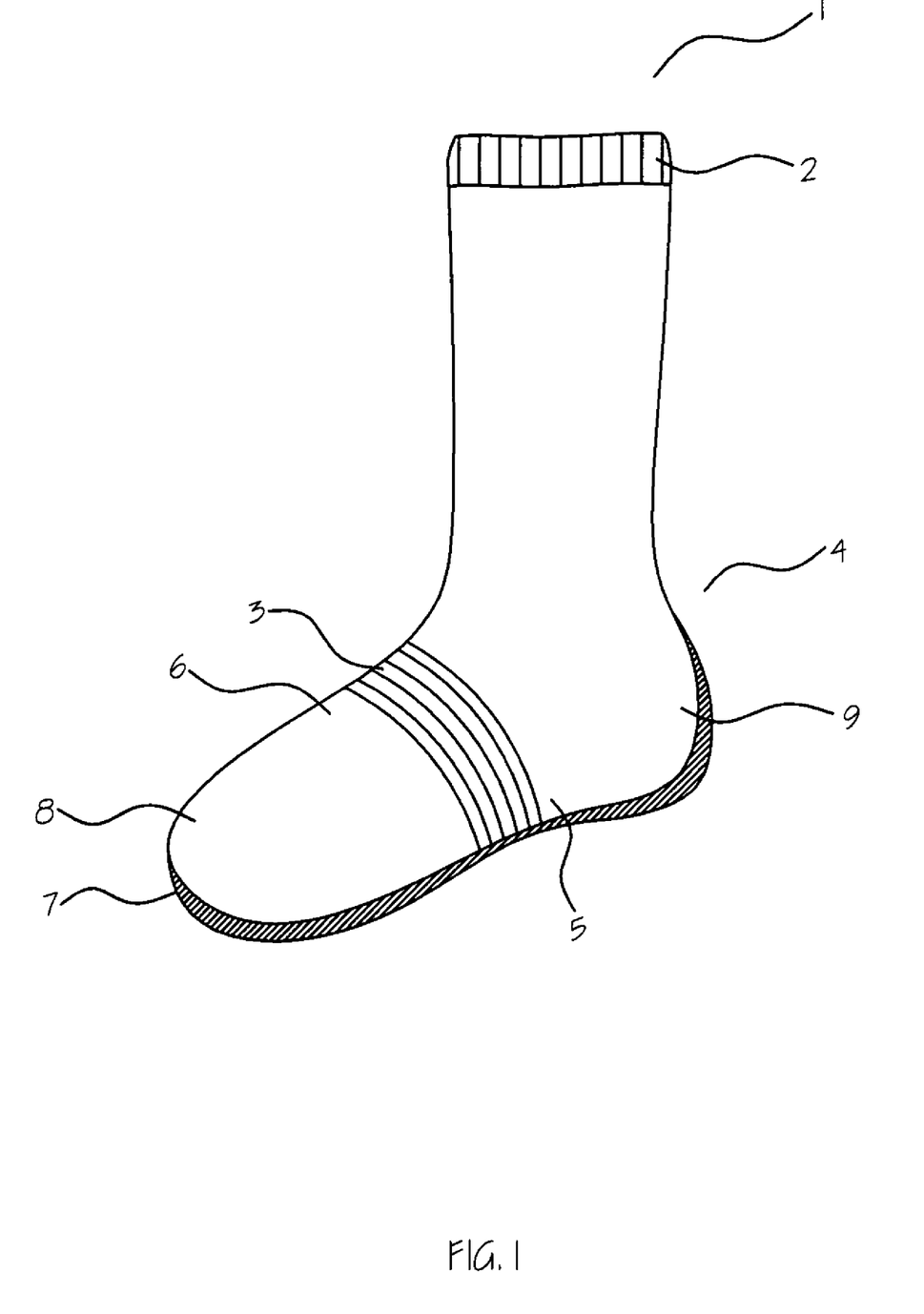
FIG. 1 is a schematic drawing of a porous rubbery polymer coated sock according to current invention.

has a melting point below 70 C.; and R is a divalent radical containing an aromatic ring and selected from the group consisting of p, p'-methylenen diphenyl, p, p'-isopropylidene-dipheny, p, p'-oxydiphenyl, p, p'-thiodiphenyl, and the foregoing radicals having methyl substituents on the rings, coiled with polyester monofilament to render elasticity to the main body. Additional cotton terry inner layer provide soft cushion layer and the yarn knitted layer provide elasticity to the sock. Twelve lines of elastic rubbery band (3) are formed surrounding the middle area of the lower part (4) of the sock from the arch portion (5) to the insole portion (6). The elastic rubbery band (3) holds the wearer's foot tightly to prevent slip off. Porous rubbery polymer of nitrile layer (7) is coated on the bottom of the sock (1). The porous rubbery polymer layer forms a cushion layer to absorb shock from running or walking and allow air pass through. The layer (7) is coated from toe portion (8) to heel portion (9) of the sock. Thickness of the polymer coated layer (7) from the toe portion (8) to the heel portion (9) is 3 mm to 5 mm depends on the application of the polymer coated sock (1) of the current invention. Thickness of the polymer coated layer (7) on the arch portion (5) is 0.5 mm.

Figure 2A:
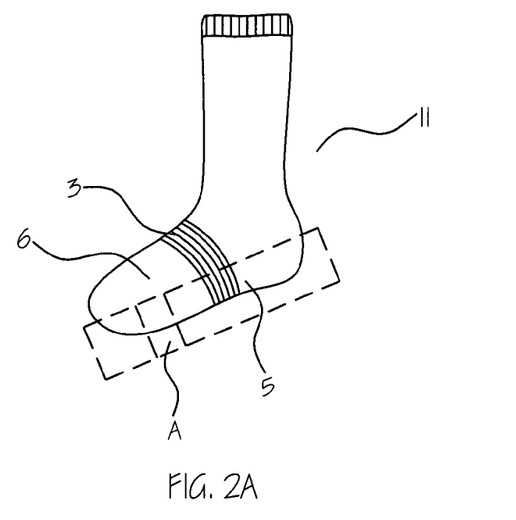
Figure 2B:
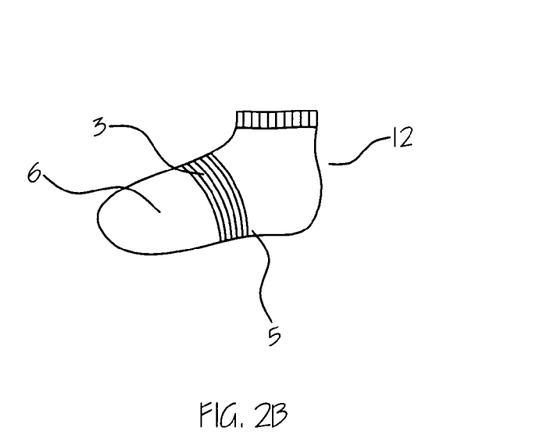
Figure 2C:
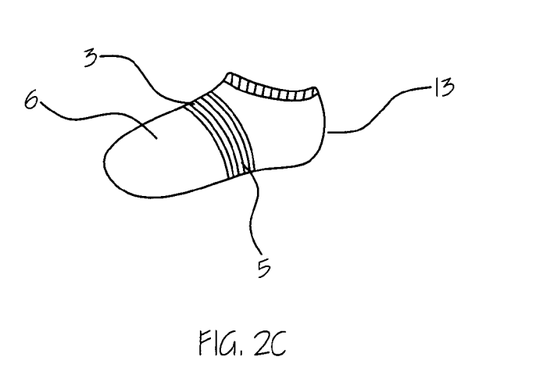
Figure 7:
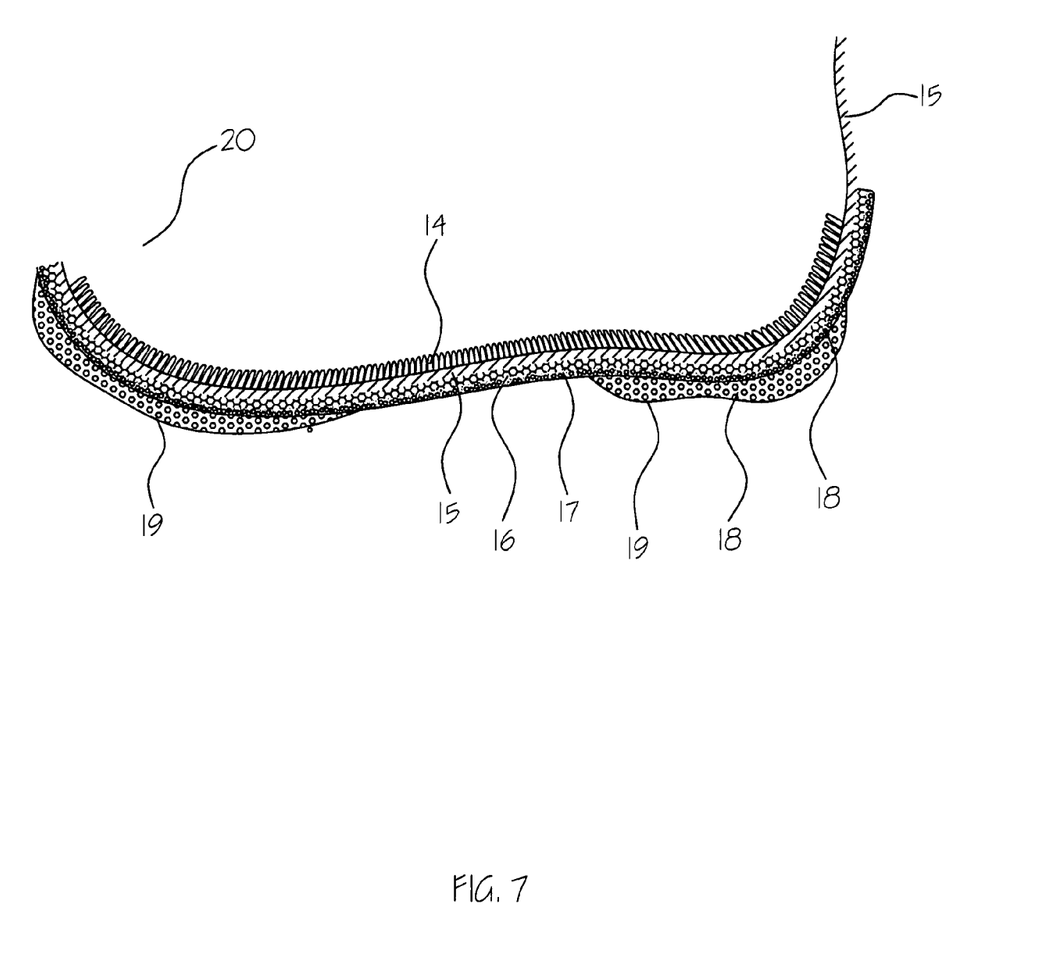

FIGS. 2-A, 2-B and 2-C are schematic drawings of base socks used for manufacturing polymer coated sock according to the current invention. Crew socks (11), ankle socks (12) and low cut socks (13) are used for porous rubbery polymer coating. All the socks have, twelve lines of elastic rubbery band (3) that is developed surrounding from the arch portion (5) to the insole portion (6). Main body of those socks are knitted with yarn comprised of Lycra® monofilament, which is comprised of a plurality of interlinear structural units having the formula FIG. 7 is a schematic cross sectional view of sock after second layer of rubber is coated and dried and washed according to steps 8 to 10.

DETAILED DESCRIPTION OF THE PREFERRED EMBODIMENT

FIG. 1 is a schematic drawing of a porous rubbery polymer coated sock (1) according to current application. The sock has elastic mock rib upper cuff (2). Main body of the sock is knitted with yarn comprised of Lycra® monofilament, which is comprised of a plurality of interlinear structural units having the formula wherein m and n are positive integers; G is a long chain polymeric radical free from substituents reactive with an isocyanate and having a molecular weight above 950 and which in its hydroxyl-terminated form, has a melting point below 70 C.; and R is a divalent radical containing an aromatic ring and selected from the group consisting of p, p'-methylenendiphenyl, p, p'-Isopropylidene-diphenyl p, p'-oxydiphenyl, p, p'-thiodiphenyl, and the foregoing radicals having methyl substituents on the rings, coiled with polyester monofilament to render elasticity to the main body.

Figure 3:
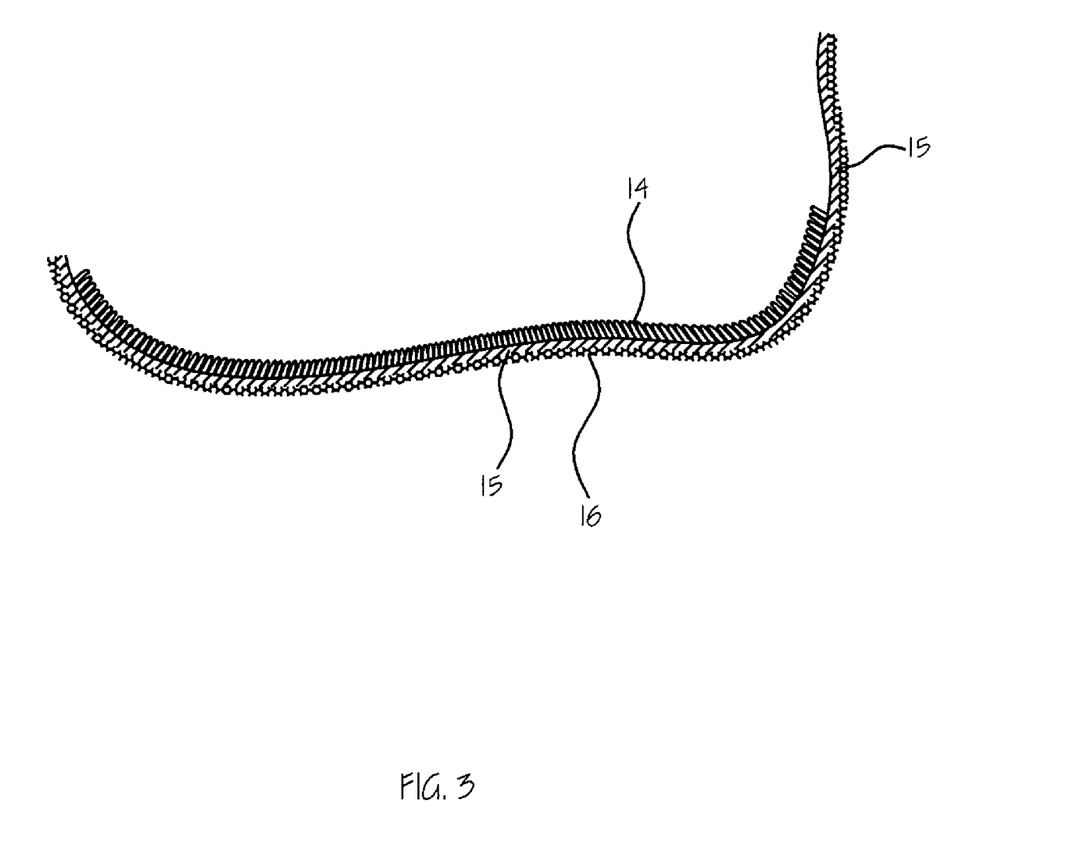
FIG. 3 is a cross sectional view of the bottom layer, section A in FIG. 2A, of the sock showing the double-layered structure therein.

FIG. 3 is a cross sectional view of the bottom layer, section 'A' in FIG. 2A, of the sock showing the double layered structure therein. Inner-layer of the sole portion of the sock is wherein m and n are positive integers; G is a long chain polymeric radical free from substituents reactive with an isocyanate and having a molecular weight above 950 and which in its hydroxyl-terminated form,

HO-G-OH provided with terry roofs (14) to form a cushion layer. The terry roof is knitted with cotton fibers. The terry roofs are formed on a needle wales as shown in the prior art of the U.S. Pat. No. 4,255,949 to Thorneburg. Difference from the '949 is that cotton fiber is used for terry roof (14) and yarn comprised of Lycra® monofilament coiled with polyester monofilament is used as main body (15) material for the sock. For the sole portion (16) of the sock, 70% stretched polyester fiber and 70% stretched nylon fibers are additionally knitted for the outer surface. Therefore, the outer surface of the sole of the sock is a layer of polymer, which is more favorable to polymer solution that will be coated thereon later.

Figure 4:
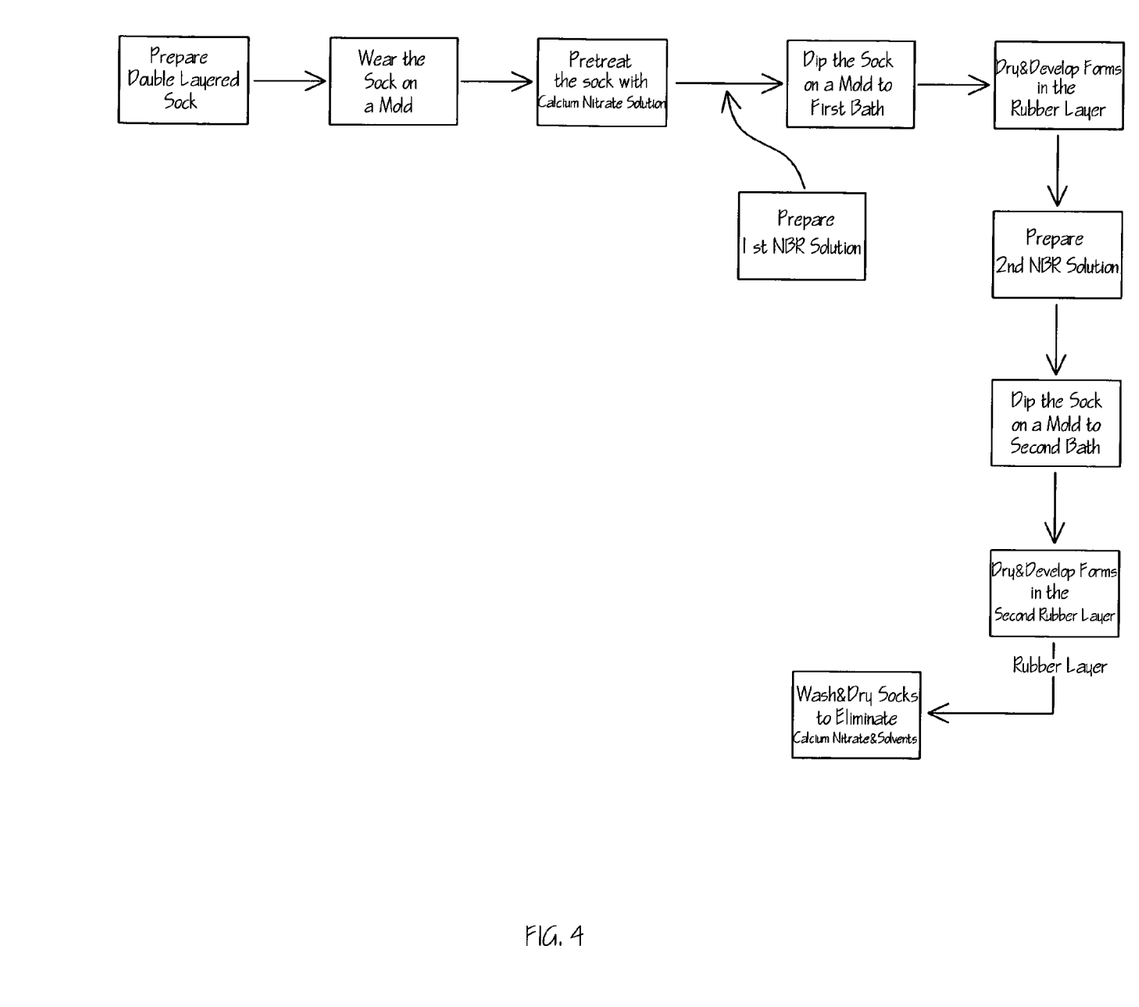
FIG. 4 is a schematic drawing of manufacturing step of the polymer coated sock according to current invention.

FIG. 4 is a schematic drawing of manufacturing step of the polymer coated sock (1) according to the current invention. And FIG. 5 is a schematic drawing of a sock (1) worn on a mold (17) for manufacturing of a porous rubbery polymer coated sock according to the current invention.

In step 1, double layered socks shown in FIGS. 2A, 2B and 2C are knitted with yarn comprised of Lycra® monofilament, which is comprised of a plurality of interlinear structural units having the formula wherein m and n are positive integers; G is a long chain polymeric radical free from substituents reactive with an isocyanate and having a molecular weight above 950 and which in its hydroxyl-terminated form,

HO-G-OH has a melting point below 70 C.; and R is a divalent radical containing an aromatic ring and selected from the group consisting of p,p'-methylenediphenyl, p,p'-isopropylidenediphenyl, p,p'-oxydiphenyl, p,p'-thiodiphenyl, and the foregoing radicals having methyl substituents on the rings, coiled with polyester monofilament to render elasticity to the main body. Twelve lines of elastic rubbery band (3) are formed surrounding the middle area of lower part (4) of the sock from the arch portion (5) to the insole portion (6). Additional terry is formed with cotton fiber to absorb sweat and the outer layer of sole of the socks are knitted with stretched polyester yarn and stretched nylon yarn for compatibility with polymer solution to be coated later.

Figure 5:
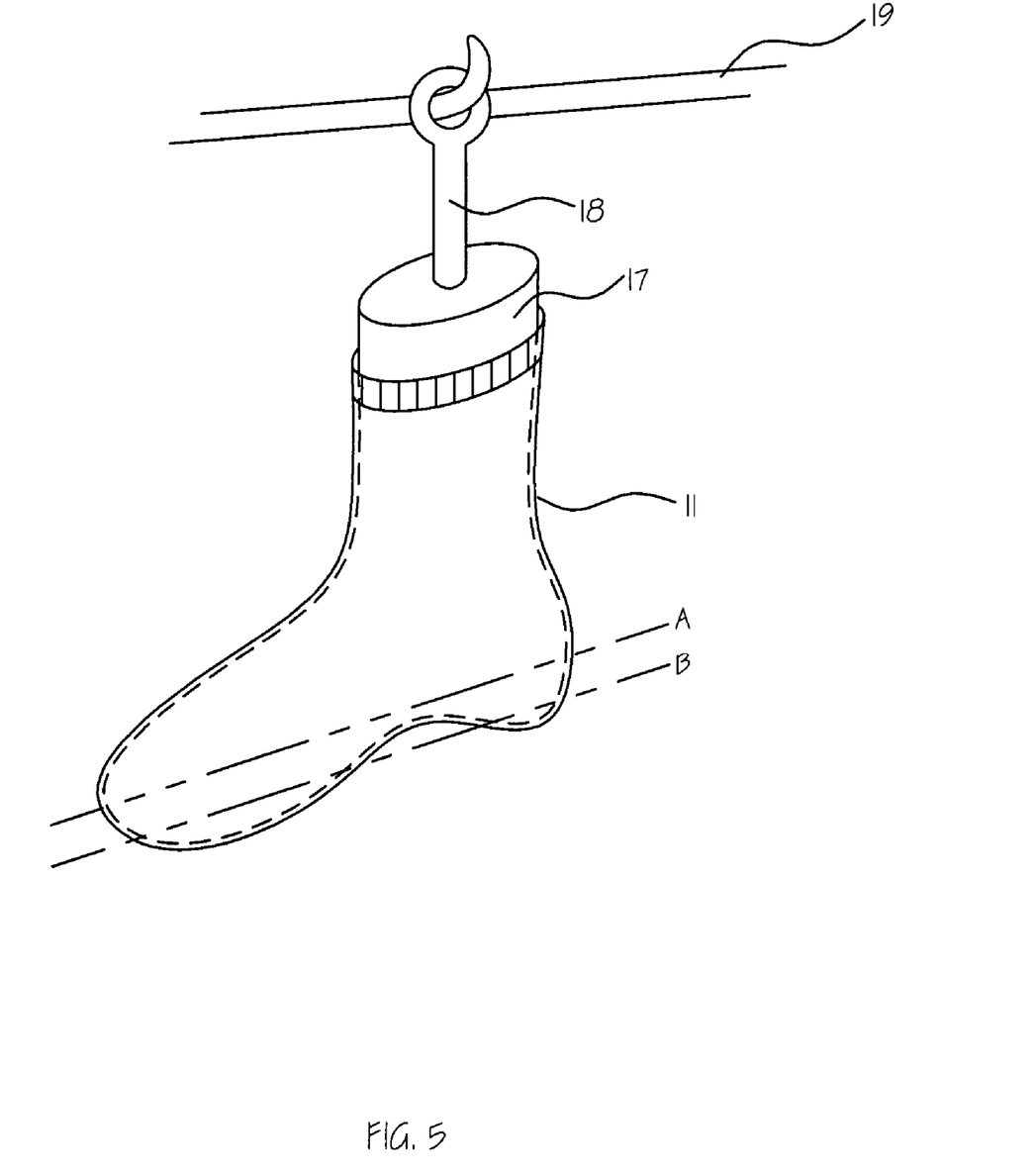
FIG. 5 is a schematic drawing of a sock worn on a mold for manufacturing of a porous rubbery polymer coated sock according to, current invention.

In step 2, socks prepared in step 1 are worn on a mold (17) as shown in FIG. 5. The mold (17) is connected to a mold hanger (18), which is hung on a conveyer line (19).

In step 3, the sock on the mold is dip into a solution of 2 to 5 wt % calcium nitrate in methanol for 2 to 5 seconds at room temperature. The sock is dip into the calcium nitrate solution up to line (A) in FIG. 5. The line (A) is marked just above the arch portion of the sock.

In step 4, a first polymer solution is prepared. 100 kg of natural rubber solution (solid portion 60~65% balanced water), 17 kg of cold NBR (acrylonitrile butadiene rubber, Mooney viscosity of 22, acrylonitrile content 27%) solution (45% cold NBR+55% distilled water) is mixed with 8 kg of polymer hardener, ZMBT (zinc-2-mercapto benzo thiazole), 0.5 kg of black dye, 5 kg of emulsion of 25% acrylate copolymer in water as a viscosity increaser that contains acrylic copolymer, 5 kg of bubbling agent (oleinic acid), and 7 kg of 1 wt % Silver impregnated Zeolite® 13A, {Na$_{12}$ (Al$_{12}$Si$_{12}$O$_{48}$) 27 H$_2$O} with 13 angstrom pore diameter of faujasite structure, for anti biotic agent. Viscosity of the solution prepared reaches 520 centipoises. The total solution is stirred with a stirrer at 1200 r.p.m. until volume of the solution bubble up twice of the original volume of the solution. It takes 30 minutes.

In step 5, the sock treated at step 3 is dip into the solution prepared in step 4 for 4 seconds. The sock is dip into the solution up to line (A) in FIG. 5. Line (A) is marked just above the arch portion.

In step 6, the sock coated with the first polymer solution is dried at 85° C. for 2 minutes.

In step 7, a second polymer solution is prepared. 100 kg of natural rubber solution (solid portion 60~65% balanced water), 17 kg of cold NBR (acrylonitrile butadiene rubber, Mooney viscosity of 22, acrylonitrile content 27%) solution (45% cold NBR+55% distilled water) is mixed with 8 kg of polymer hardener, ZMBT (zinc-2-mercapto benzo thiazole), 0.5 kg of black dye, 10 kg of acrylic viscosity increaser, 5 kg of bubbling agent (oleic acid), and 7 kg of 1 wt % Silver impregnated Zeolite 13A (Na—Y type zeolite with inside diameter of 13 Angstrom) for anti biotic agent.

Viscosity of the solution prepared reaches 875 centipoises. The total solution is stirred with a stirrer at 1,200 r.p.m. until volume of the solution bubble up twice of the original volume of the solution. It usually takes 30 minutes.

In step 8, the sock treated at step 6 is dip into the second solution prepared in step 7 for 10 seconds. The sock is dip into the solution up to line (B) in FIG. 5. Line (B) is marked between the arch portion and bottom of the sock.

In step 9, the second polymer solution coated sock is dried at 85° C. for 30 minutes.

In step 10, the sock from step 9 is washed in a cleaning solution to eliminate the calcium nitrate and organic solvents and dried 110° C. for 40 minutes.

Figure 6:
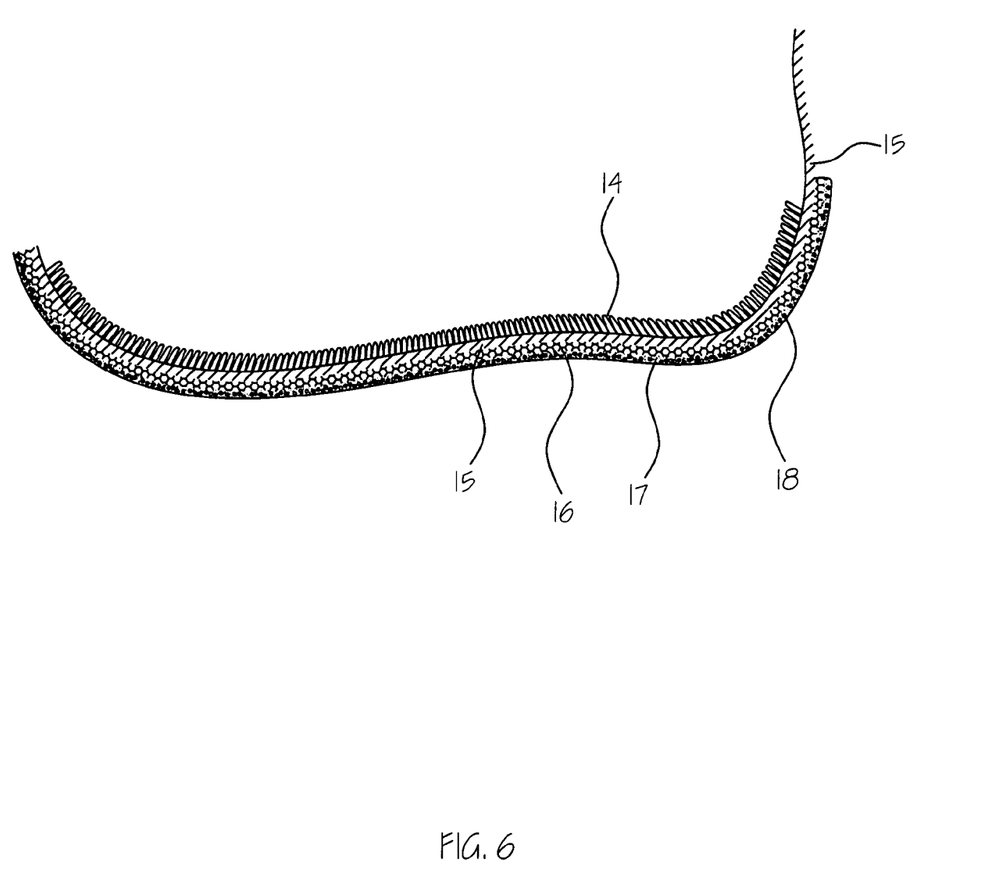
FIG. 6 is a schematic cross sectional view of sock after first layer of rubber is coated and dried according to steps 5 and 6.

FIG. 6 is a schematic cross sectional view of sock after first layer of rubber is coated and dried according to steps 5 and 6. A first porous layer (17) of nitrile rubber is developed along the outer surface of the sole portion (16) of the sock, which is knit with stretched polyester fiber and stretched nylon fibers. Thickness of the first porous layer is 0.3 to 0.5 mm. Average diameter of the voids (18) in the layer is 0.5 μm.

FIG. 7 is a schematic cross sectional view of sock after second layer of rubber is coated and dried and washed according to steps 8 to 10. Second porous layers (19) of nitrile rubber is developed along the outer surface from toe to ball portion (20) of the sock and heel portion (21) of the sock, which is already coated with a first porous layer (17) of nitrile rubber. Thickness of the second porous layer is 3 to 5 mm. Average diameter of the voids (18) in the layer is 0.5 μm.

Air permeability of the first polymer layer coated sock and first and second polymer layer coated sock portion are measured. Anti biotic ability of the 1 wt % Silver impregnated Zeolite 13A (Na—Y type zeolite with inside diameter of 13 Angstrom) in the nitrile polymer coated sock is compared with base sock which is not coated with the nitrile polymer solution. The results are summarized in Table 1.

TABLE 1

Permeability and Anti biotic ability

|  |  | First layer coated sock | First & second layer coated portion | Non coated base sock |
|---|---|---|---|---|
| Permeability $cm^3/cm^2/sec$ |  | 0.9 | 0.5 | n.a. |
| Anti biotic ability | Initial (No. of bacteria) | $2.5 \times 10^4$ | $2.5 \times 10^4$ | $2.5 \times 10^4$ |
|  | 18 hours later decreasing ratio | less than 10 99.9% | less than 10 99.9% | $2.7 \times 10^4$ Negative |

As shown in the table 1, permeability of air decreases from 0.9 $cm^3/cm^2/sec$ to 0.5 $cm^3/cm^2/sec$ as the second polymer layer is added to the first polymer layer. Air permeability of a non coated base sock is out of the range of measuring equipment.

Anti biotic ability due to the 1 wt % Silver impregnated Zeolite 13A (Na—Y type zeolite with inside diameter of 13 Angstrom) used in the polymer layers is remarkable. Three kind samples, non coated base sock, first layer coated sock, and final double layered sock are exposed to bacteria under same environment. Initial number of bacteria is same for all three samples. After 18 hours almost bacteria in the polymer coated socks are gone. Meanwhile, number of bacteria in non coated base sock increases.

It is clearly easy for average skilled man in this area to apply polyurethane rubber foam to socks, shoes and any kind of textile material that needs permeability, anti biotic ability and cushion from the teaching of the current invention.

What is claimed is:

1. A method of producing porous flexible polymer coated socks that is comprised of:

step 1 of preparing double layered socks, which are knitted with yarn comprised of monofilament, which is comprised of a plurality of interlinear structural units having the formula, and the foregoing radicals having methyl substituents on the rings, coiled with polyester monofilament to render elasticity to the main body and having additional terry that is formed with cotton fiber to absorb sweat, and the outer layer of the sole of the sock is knitted with 70% stretched polyester yarn and 70% stretched nylon yarn for compatibility with the polymer solution to be coated later and twelve lines of elastic rubbery band are formed surrounding the middle area of the lower part of the sock from the arch portion to the insole portion, and step 2 of wearing socks prepared in step 1 on a mold that is connected to a mold hanger, which is hung on a conveyer line, and step 3 of dipping the sock worn on the mold into a solution of 4 wt % calcium nitrate in methanol for 4 seconds at room temperature up to line (A) that is marked just above the arch portion of the sock, and step 5 of dipping the sock treated at step 3 into the solution prepared in step 4 for four seconds up to line (A) that is marked just above the arch portion of the sock, and step 6 of drying the first polymer solution coated sock at 85° C. for 2 minutes, and step 7 of preparing a second polymer solution having viscosity of 875 centipoises by mixing 100 kg of natural rubber solution (solid portion 65% balanced water), 17 kg of cold NBR (acrylonitrile butadiene rubber, Mooney viscosity of 22, acrylonitrile content 27%) solution (45% cold NBR+55% distilled water), 8 kg of polymer hardener ZMBT (zinc-2-mercapto benzo thiazole), 0.5 kg of black dye, 10 kg of acrylic viscosity increaser, 5 kg of bubbling agent (oleic acid), 7 kg of 1 wt % Silver impregnated $\{Na_{12}(Al_{12}Si_{12}O_{48})\ 27\ H_2O\}$, which has 13 angstrom pore diameter of faujasite structure, for anti biotic agent and stirring the total solution with stirring at 1200 r.p.m. for 30 minutes, and step 8 of dipping the sock treated at step 6 into the second solution prepared in step 7 for 10 seconds up to a line (B) that is marked between the arch portion and bottom of the sock, step 9 of drying the second polymer solution coated sock at 85° C. for 30 minutes, and step 10 of washing the sock from step 9 in a cleaning solution to eliminate the calcium nitrate and organic solvents and drying 110° C. for 40 minutes.

2. A method of producing porous rubbery polymer coated socks of claim 1, wherein the double-layered sock, knitted with yarn comprised of monofilament, which is comprised of a plurality of interlinear structural units having the formula wherein m and n are positive integers; G is a long chain polymeric radical free from substituents reactive with an isocyanate and having a molecular weight above 950 and which in its hydroxyl-terminated form, has a melting point below 70 C.; and R is a divalent radical containing an aromatic ring and selected from the group consisting of p,p'-methylenendiphenyl, p,p'-isopropylidenediphenyl, p,p'-oxydiphenyl, p,p'-thiodiphenyl, wherein m and n are positive integers; G is a long chain polymeric radical free from substituents reactive with an isocyanate and having a molecular weight above 950 and which in its hydroxyl-terminated form, has a melting point below 70 C.; and R is a divalent radical containing an aromatic ring and selected from the group consisting of p, p'-methylenendiphenyl, p, p'-isopropylidenediphenyl, p, p'-oxydiphenyl, p, p'-thiodiphenyl, and the foregoing radicals having methyl substituents on the rings, coiled with polyester monofilament is crew sock.

3. A method of producing porous rubbery polymer coated socks of claim 1, wherein the double-layered sock, knitted with yarn comprised of monofilament, which is comprised of a plurality of interlinear structural units having the formula wherein m and n are positive integers; G is a long chain polymeric radical free from substituents reactive with an isocyanate and having a molecular weight above 950 and which in its hydroxyl-terminated form,

HO-G-OH has a melting point below 70 C.; and R is a divalent radical containing an aromatic ring and selected from the group consisting of p,p'-methylenendiphenyl, p,p'-isopropylidenediphenyl, p,p'-oxydiphenyl, p,p'-thiodiphenyl, and the foregoing radicals having methyl substituents on the rings, coiled with polyester monofilament, is ankle sock.

4. A method of producing porous rubbery polymer coated socks of claim 1, wherein the double-layered sock, knitted with yarn comprised of monofilament, which is comprised of a plurality of interlinear structural units having the formula wherein m and n are positive integers; G is a long chain polymeric radical free from substituents reactive with an isocyanate and having a molecular weight above 950 and which in its hydroxyl-terminated form,

HO-G-OH has a melting point below 70 C.; and R is a divalent radical containing an aromatic ring and selected from the group consisting of p, p'-methylenendiphenyl, p, p'-isopropylidenediphenyl, p, p'-oxydiphenyl, p, p'-thiodiphenyl, and the foregoing radicals having methyl substituents on the rings, coiled with polyester monofilament is low cut sock.

5. A method of producing porous rubbery polymer coated socks of claim 1, wherein the porous rubbery polymer coated sock has air permeability of 0.9 $cm^3/cm^2$/sec at the first layer and second layer coated portion.

6. A method of producing porous rubbery polymer coated socks of claim 1, wherein the porous rubbery polymer coated sock shows anti biotic ability of eliminating 99% of bacteria after 18 hours.

* * * * *